(12) United States Patent
Chiang

(10) Patent No.: US 8,553,974 B2
(45) Date of Patent: Oct. 8, 2013

(54) METHOD AND CIRCUIT FOR CORRECTING SIGNALS AND IMAGE CORRECTING METHOD AND CIRCUIT USING THE SAME

(75) Inventor: Ming-Feng Chiang, Miaoli County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1328 days.

(21) Appl. No.: 11/861,300

(22) Filed: Sep. 26, 2007

(65) Prior Publication Data
US 2009/0003695 A1   Jan. 1, 2009

(30) Foreign Application Priority Data
Jun. 28, 2007   (TW) .............................. 96123513 A

(51) Int. Cl.
*G06K 9/00*   (2006.01)

(52) U.S. Cl.
USPC ........ 382/162; 382/167; 382/166; 348/266.1; 348/222.1

(58) Field of Classification Search
USPC ........... 382/166, 162, 167; 348/226.1, 222.1, 348/348/227.1, 228.1, 234, 294, 297, 298, 348/221, 223.1, 364, 366
See application file for complete search history.

(56) References Cited

U.S. PATENT DOCUMENTS

| | | | | |
|---|---|---|---|---|
| 4,035,835 A * | 7/1977 | Poetsch | ...................... | 348/228.1 |
| 7,636,471 B2 * | 12/2009 | Strom et al. | .................. | 382/166 |
| 7,663,669 B2 * | 2/2010 | Kushida | .................... | 348/228.1 |
| 7,705,893 B2 * | 4/2010 | Kinoshita | .................. | 348/226.1 |
| 7,734,105 B2 * | 6/2010 | Strom et al. | .................. | 382/239 |
| 2002/0186388 A1 * | 12/2002 | Tanioka et al. | ................ | 358/1.9 |
| 2008/0165397 A1 * | 7/2008 | Lin | .............................. | 358/520 |

* cited by examiner

Primary Examiner — Mekonen Bekele
(74) Attorney, Agent, or Firm — Jianq Chyun IP Office

(57) ABSTRACT

A signal correcting method and a circuit thereof are provided. In the method, first, the values of a plurality of input signals are clamped to generate a plurality of corresponding clamping signals according to a plurality of adjustable predetermined values. Then, a combined multiplication operation is performed to the clamping signals according to the coefficients in a matrix obtained by multiplying the coefficients in at least two predetermined correcting matrixes, so as to output a plurality of results. Next, the results are respectively clamped according to a plurality of corresponding predetermined thresholds so as to output the corrected input signals.

19 Claims, 9 Drawing Sheets

US 8,553,974 B2

METHOD AND CIRCUIT FOR CORRECTING SIGNALS AND IMAGE CORRECTING METHOD AND CIRCUIT USING THE SAME

CROSS-REFERENCE TO RELATED APPLICATION

This application claims the priority benefit of Taiwan application serial no. 96123513, filed Jun. 28, 2007. All disclosure of the Taiwan application is incorporated herein by reference.

BACKGROUND OF THE INVENTION

1. Field of the Invention

The present invention generally relates to a multiplier algorithm for correcting signals and a circuit thereof, in particular, to a combined multiplier algorithm and a circuit thereof which can output corrected signals, and an image correcting method and a circuit thereof using the same.

2. Description of Related Art

In the processing of digital image signals, a multiplier is usually adopted in an image processing integrated circuit (IC) for executing signal multiplication. For example, in the image processing IC of a digital camera, several image signal processing procedures are usually performed to a digital image signal, as shown in FIG. 1.

FIG. 1 illustrates the processing procedures in an image processing IC. In the digital camera, first, an analog signal output by the image sensor is converted into digital red, green, and blue (RGB) signals by the analog/digital converter of the sensor analog front end, and then the signals are processed by the image processing IC. Referring to FIG. 1, the image processing IC performs such processes as the white balance gain correction 102, the inverse optical electronic conversion function 104, the color filter array interpolation 106, the color correction 108, the color space transform 110, and the gamma correction 112 to obtain a desired image signal $I_m$, wherein the color space transform 110 is to convert the RGB signals into a luminance signal Y and two chroma signals Cb, Cr.

Generally speaking, the processes performed and the order in which they are performed may differ according to different algorithms. However, a multiplier has to be used in foregoing white balance gain correction 102, color correction 108, or color space transform 110. To reduce the cost of an image processing IC, the multipliers in different processes are usually combined. For example, the multipliers used in the white balance gain correction 102 and the color correction 108 are combined, as shown in FIG. 2, or the multipliers used in the color correction 108 and the color space transform 110 are combined, as shown in FIG. 3, or even the multipliers used in the white balance gain correction 102, the color correction 108, and the color space transform 110 are all combined, as shown in FIG. 4. FIGS. 2~4 are diagrams illustrating the combinations of multipliers in various processes.

However, problems may be caused if the multipliers in different processes are simply combined without any additional process, wherein the main problem is that when an out-of-domain value (illegal value) is input into the entire calculation formula, the calculated result will overflow, namely, an incorrect result will be obtained. From our observation, such incorrect results may cause abnormal colors in the high luminance regions of an image, and accordingly reduce the quality of the entire image. This situation will be described in detail below.

FIG. 5 illustrates a general multiplication circuit. In the general multiplication circuit, a multiplier 502 performs a multiplication on an input signal IN and another signal A, and an output clamp circuit 504 clamps the domain of the output result OUT. The output clamp circuit 504 usually has a fixed maximum clamp value in accordance with the bit number of the output result OUT. For example, the maximum clamp value is 255 if the output result OUT has 8 bits, and the maximum clamp value is 1023 if the output result OUT has 10 bits. However, unexpected value will be produced if the multipliers are combined and the original multiplication circuit in FIG. 5 is adopted without making any corresponding correction.

An example will be explained below, wherein the output result has 8 bits and the white balance gain correction and color correction are performed. If the white balance gain correction is performed when the multipliers in foregoing two processes are not combined, the output is expressed as:

$$\begin{bmatrix} R \\ G \\ B \end{bmatrix}_{o1} = \begin{bmatrix} R_{gain} & 0 & 0 \\ 0 & G_{gain} & 0 \\ 0 & 0 & B_{gain} \end{bmatrix} \times \begin{bmatrix} R \\ G \\ B \end{bmatrix}_i \quad (1)$$

Assuming $(R_i, G_i, B_i)=(230, 240, 190)$ and the R signal gain coefficient $R_{gain}$, the G signal gain coefficient $G_{gain}$, and the B signal gain coefficient $B_{gain}$ in the white balance gain correcting matrix are respectively 1.5, 1, and 1.25, the output value of the white balance gain correcting process is: $(R_{o1}, G_{o1}, B_{o1})=(345, 240, 237.5)$. Then, the domain of the output value is clamped by the output clamp circuit to obtain: $(R_{o1}, G_{o1}, B_{o1})=(255, 240, 237.5)$. Next, color correction is performed to the value (255, 240, 237.5):

$$\begin{bmatrix} R \\ G \\ B \end{bmatrix}_{o2} = \begin{bmatrix} rr & rg & rb \\ gr & gg & gb \\ br & bg & bb \end{bmatrix} \times \begin{bmatrix} R \\ G \\ B \end{bmatrix}_{o1} \quad (2)$$

with following color correcting coefficients:

$$\begin{bmatrix} rr & rg & rb \\ gr & gg & gb \\ br & bg & bb \end{bmatrix} = \begin{bmatrix} 1.3 & -0.2 & -0.1 \\ 0.1 & 1.4 & -0.5 \\ -0.2 & -0.3 & 1.5 \end{bmatrix} \quad (3)$$

to obtain: $(R_{o2}, G_{o2}, B_{o2})=(259.75, 242.75, 233.75)$. Thereafter, the domain of the output value is again clamped by the output clamp circuit to obtain a normal output value: $(R_{o2}, G_{o2}, B_{o2})=(255, 242.75, 233.75)$.

However, if the multipliers in the white balance gain correction and color correcting processes are directly combined, the combined matrix is:

$$\begin{bmatrix} R \\ G \\ B \end{bmatrix}_{o2} = \begin{bmatrix} rr & rg & rb \\ gr & gg & gb \\ br & bg & bb \end{bmatrix} \times \begin{bmatrix} R_{gain} & 0 & 0 \\ 0 & G_{gain} & 0 \\ 0 & 0 & B_{gain} \end{bmatrix} \times \begin{bmatrix} R \\ G \\ B \end{bmatrix}_i \quad (4)$$

wherein $$\begin{bmatrix} rr & rg & rb \\ gr & gg & gb \\ br & bg & bb \end{bmatrix} \times \begin{bmatrix} R_{gain} & 0 & 0 \\ 0 & G_{gain} & 0 \\ 0 & 0 & B_{gain} \end{bmatrix} = \begin{bmatrix} 1.95 & -0.2 & -0.125 \\ 0.15 & 1.4 & -0.625 \\ -0.3 & -0.3 & 1.875 \end{bmatrix} \quad (5)$$

FIG. 6 is a circuit diagram of the conventional hardware implementation of a combined multiplier, wherein the image correcting coefficients are as shown in the matrix of equation (5). Referring to FIG. 6, the conventional combined multiplier includes a plurality of multipliers, adders, and output clamp circuits. For example, in FIG. 6, 602 represents a multiplier, 604 represents an adder, and 606 represents an output clamp circuit. Assuming the input signal ($R_i$, $G_i$, $B_i$) is still (230, 240, 190), then the result of equation (5) is (376.75, 251.75, 215.25), and after that, the domain of the result is clamped by the output clamp circuit to obtain ($R_{o2}$, $G_{o2}$, $B_{o2}$)=(255, 251.75, 215.25). However, this output result is incorrect, and the correct output result should be (255, 242.75, 233.75).

Similarly, if the input signal ($R_i$, $G_i$, $B_i$) is high luminance such as (255, 255, 255), then the result of equation (5) is (414.375, 235.875, 325.125), and after that, the domain of the result is clamped by the output clamped circuit to obtain ($R_{o2}$, $G_{o2}$, $B_{o2}$)=(255, 235.875, 255). However, this output result makes the actual image purplish. Thus, the value (255, 235.875, 255) is incorrect, and the correct value should be (255, 255, 255).

Accordingly, how to output correct values and accordingly ensure correct image color with combined multiplier to reduce hardware cost is needed to be resolved.

SUMMARY OF THE INVENTION

Accordingly, the present invention is directed to a combined multiplier algorithm and a circuit thereof, wherein a correct calculation result can be obtained with reduced hardware cost.

The present invention is directed to a combined multiplier algorithm and a circuit thereof, wherein a corrected image signal can be output if the combined multiplier algorithm and the circuit thereof are applied to image processing.

The present invention provides a combined multiplier algorithm and a circuit thereof, wherein abnormal colors in the high luminance regions of an image caused by the combined multiplier can be avoided.

A signal correcting method provided by the present invention is suitable for a combined multiplication algorithm. The combined multiplication algorithm includes at least a plurality of multiplication parameters, and a combined multiplication parameter is obtained by multiplying these multiplication parameters. The signal correcting method includes following steps. A pre-clamping step is performed to clamping a plurality of input signals according to a plurality of adjustable predetermined values so as to generate a plurality of corresponding clamping signals. A combined multiplication operation is performed to each of the clamping signals according to the combined multiplication parameter so as to output a plurality of results. The results are respectively clamped according to a plurality of corresponding predetermined thresholds so as to output the corrected input signals.

A signal correcting circuit provided by the present invention includes an input clamp apparatus, a combined multiplication apparatus, and an output clamp apparatus. The input clamp apparatus receives a plurality of input signals and respectively clamps the input signals according to a plurality of adjustable predetermined values so as to output a plurality of clamping signals. The combined multiplication apparatus performs a combined multiplication operation to the clamping signals according to a combined multiplication parameter so as to output a plurality of results, wherein at least a plurality of multiplication parameters is used in the combined multiplication operation, and the combined multiplication parameter is obtained by multiplying the multiplication parameters. The output clamp apparatus respectively clamps foregoing results according to a plurality of predetermined thresholds so as to output the corrected input signals.

If foregoing signal correcting method and circuit are applied to an image correcting method and a circuit thereof, the multiplication parameters are a matrix of coefficients and which include a color correcting matrix and a white balance gain matrix. The combined multiplication parameter is obtained by multiplying the coefficients in the color correcting matrix and the coefficients in the white balance gain matrix.

When the image input signals include signals of three primary colors R, G, and B, the white balance gain matrix includes an R signal gain coefficient, a G signal gain coefficient, and a B signal gain coefficient. Foregoing adjustable predetermined values include three adjustable predetermined values obtained by dividing the maximum values corresponding to the image input signals respectively by the R signal gain coefficient, the G signal gain coefficient, and the B signal gain coefficient.

In the image correcting method and circuit described above, the multiplication parameters include coefficients in a color correcting matrix and a color space transform matrix, wherein the multiplication parameters are obtained by multiplying the coefficients in the color space transform matrix and the coefficients in the color correcting matrix.

In the image correcting method and circuit described above, the multiplication parameters include coefficients in a white balance gain matrix, a color correcting matrix, and a color space transform matrix, wherein the multiplication parameters are obtained by sequentially multiplying the coefficients in the color space transform matrix and the coefficients in the color correcting matrix and the white balance gain matrix.

In the image correcting method and circuit described above, the predetermined thresholds are the maximum values corresponding to the image input signals.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
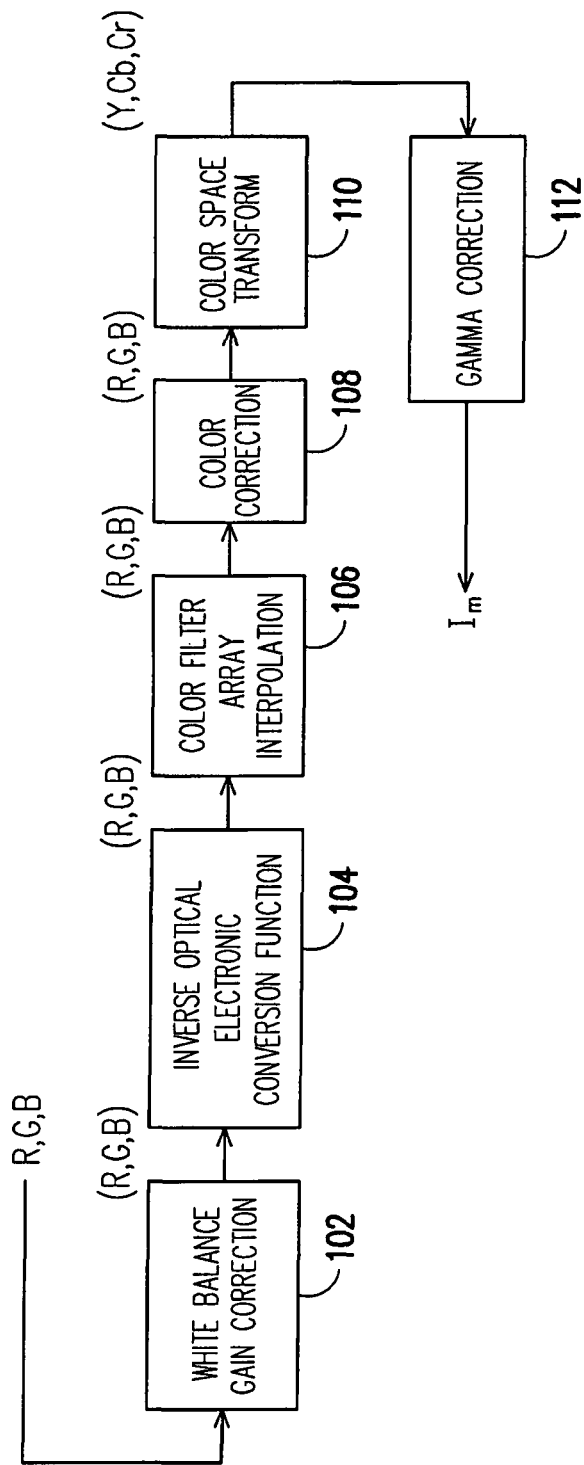
FIG. 1 illustrates the processing procedures in an image processing IC.
Figure 2:
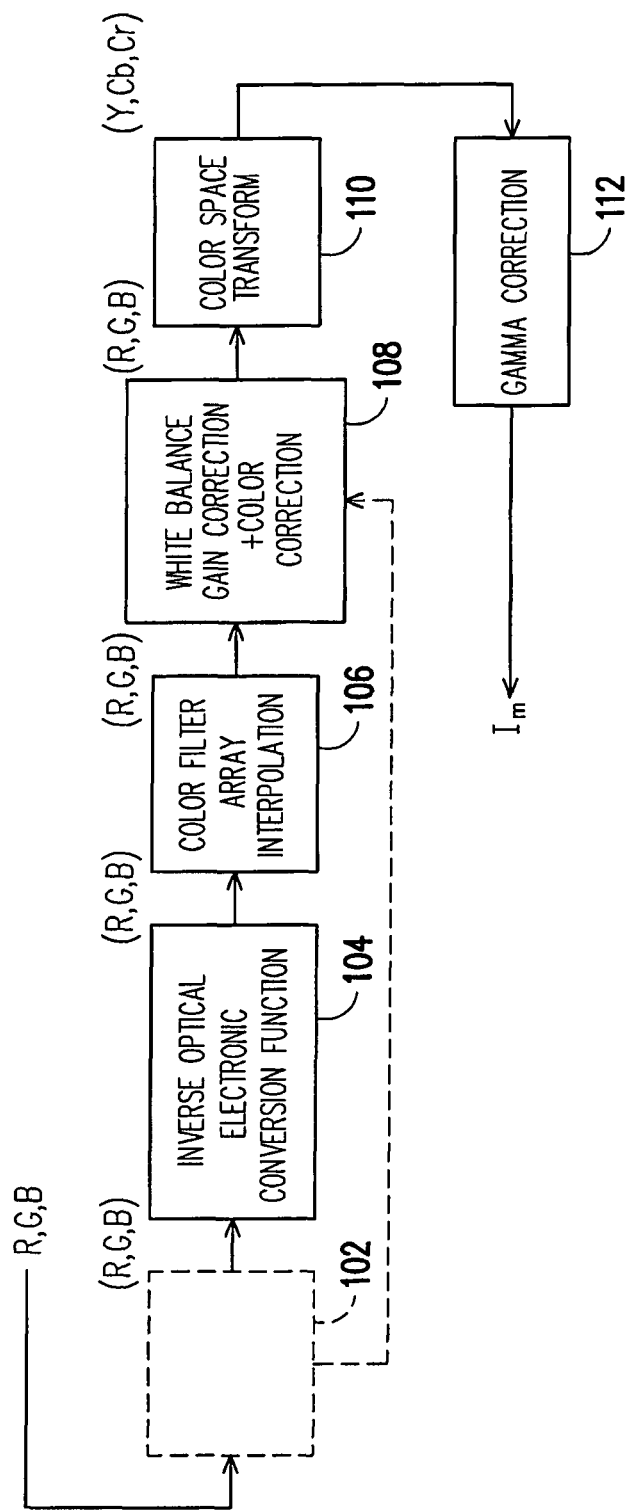
FIGS. 2~4 are diagrams illustrating the combinations of multipliers in various processes.
Figure 3:
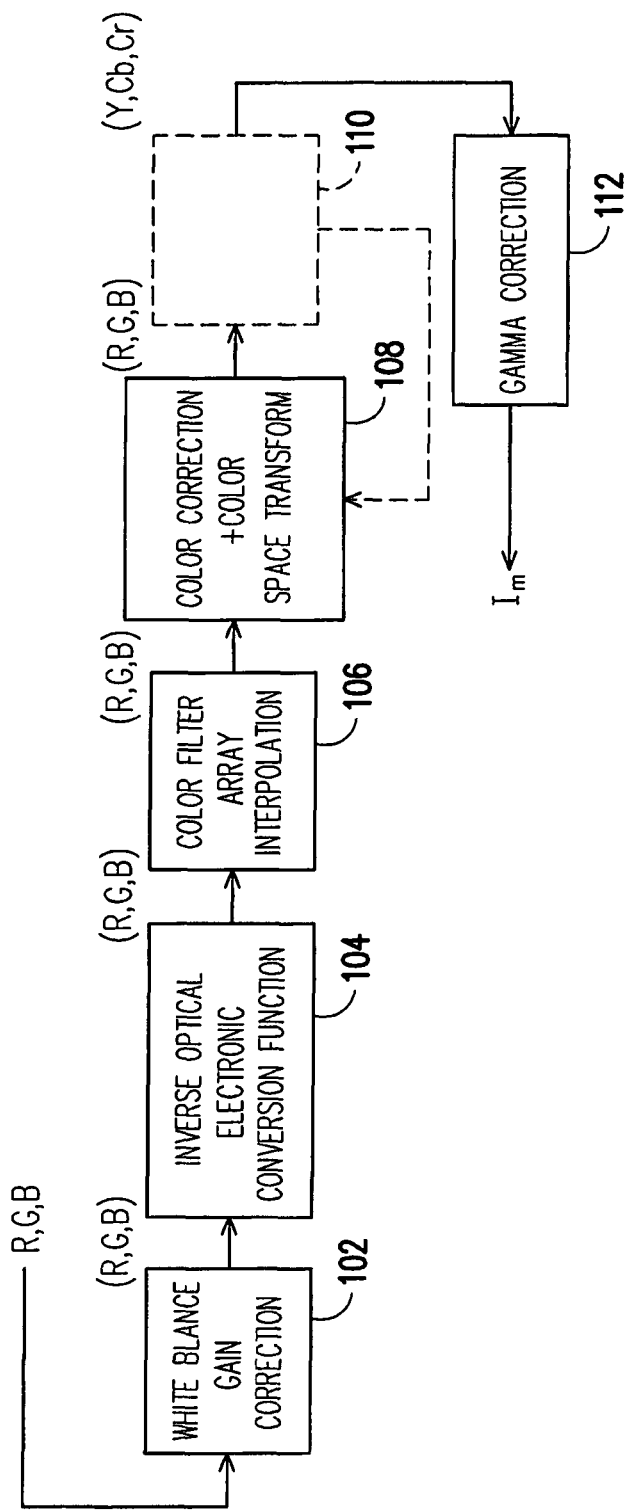
Figure 4:
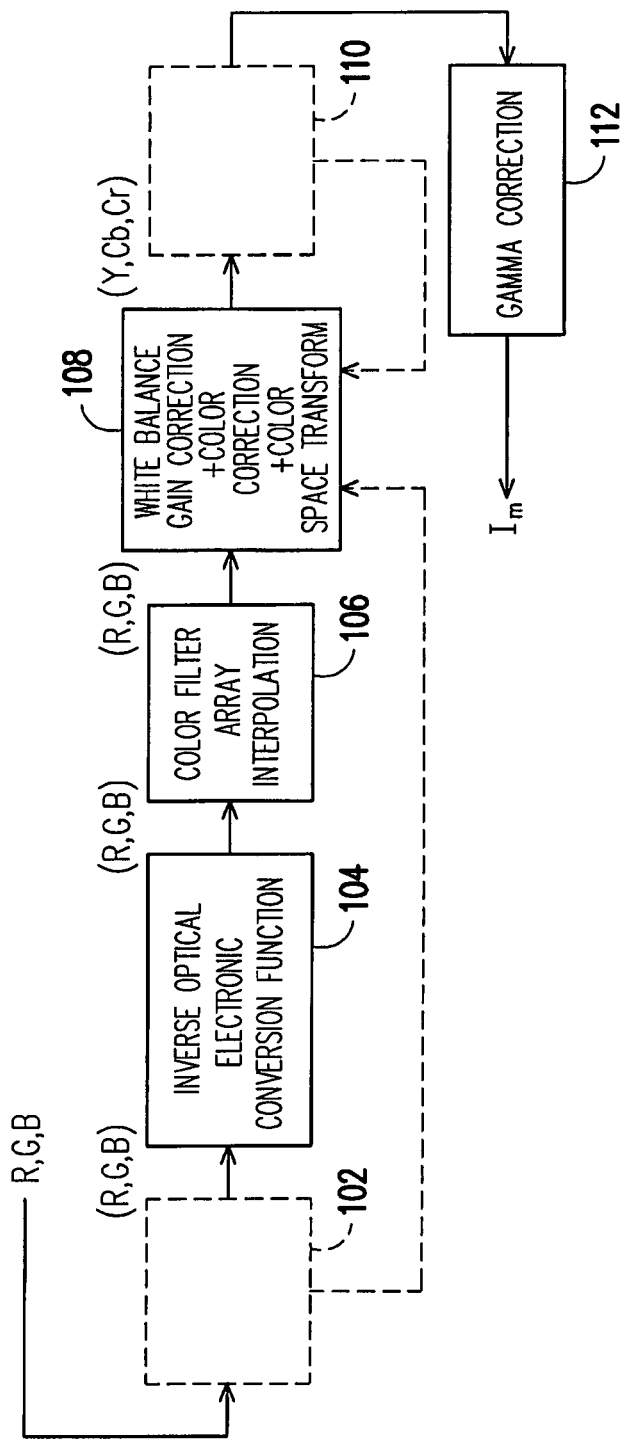
Figure 5:
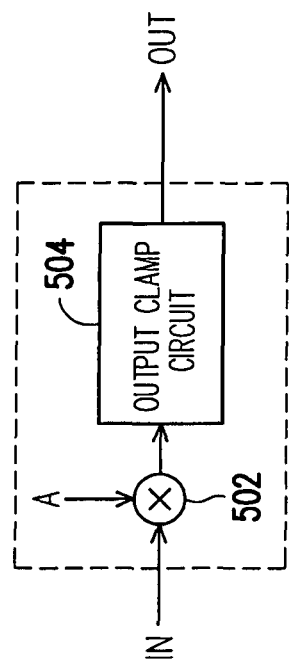
FIG. 5 illustrates a general multiplication circuit.
Figure 6:
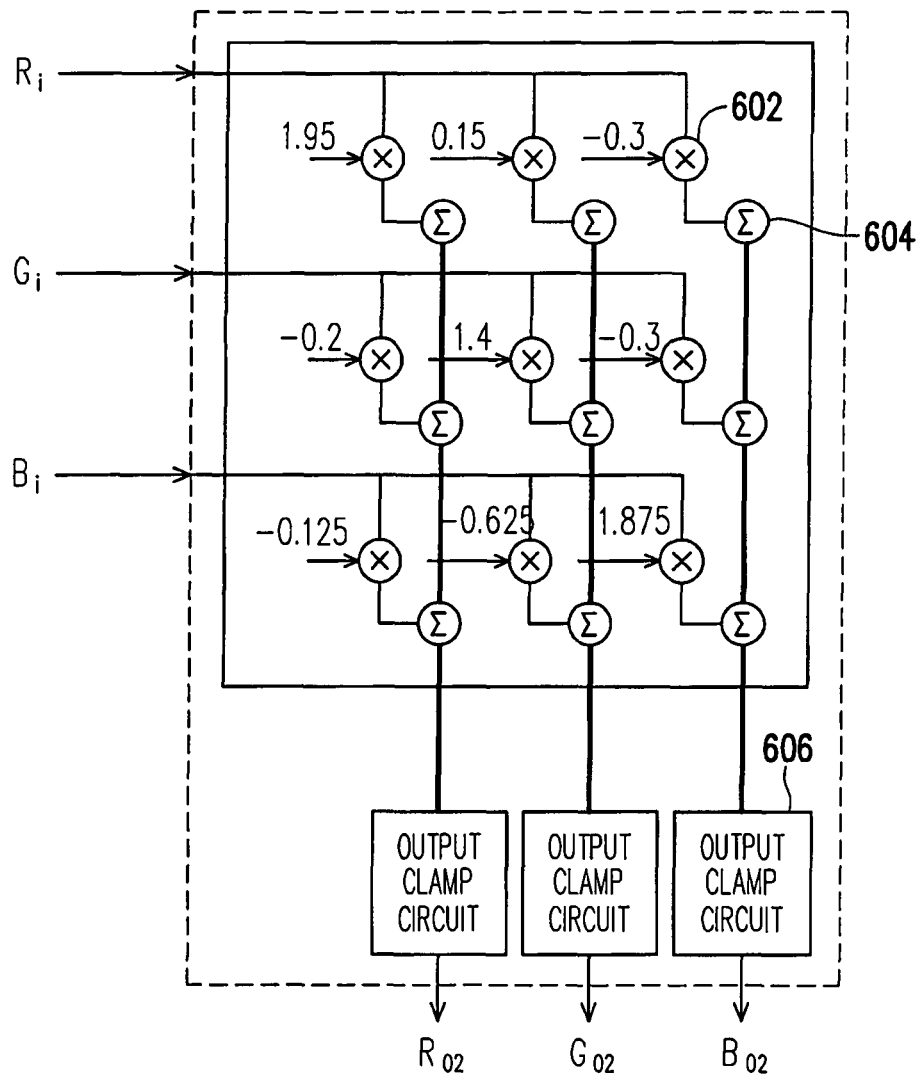
FIG. 6 is a circuit diagram of the conventional hardware implementation of a combined multiplier.

Reference will now be made in detail to the present preferred embodiments of the invention, examples of which are illustrated in the accompanying drawings. Wherever possible, the same reference numbers are used in the drawings and the description to refer to the same or like parts.

The present invention provides a combined multiplication method and a circuit thereof, wherein correct results can be output with reduced hardware cost. In foregoing combined multiplication method, at least a plurality of multiplication parameters is first multiplied to obtain a combined multiplication parameter, and combined multiplication operations are performed according to the combined multiplication parameter. Accordingly, the hardware cost can be reduced, and meanwhile, correct output can be obtained.

If the combined multiplication method and circuit provided the present invention are applied to an image correcting method and a circuit thereof, these multiplication parameters may be coefficients in a color correcting matrix and a white balance gain matrix. The combined multiplication parameter may be obtained by multiplying the coefficients in the color correcting matrix and the coefficients in the white balance gain matrix, by multiplying the coefficients in the color space transform matrix and the coefficients in the color correcting matrix, or by sequentially multiplying the coefficients in the color space transform matrix and the coefficients in the color correcting matrix and the white balance gain matrix.

In the image correcting method and circuit provided by the present invention, the hardware cost is reduced by the combined multiplier, and meanwhile, the combined multiplication algorithm outputs correct values. Thus, the color in a displayed image is correct.

According to the present invention, the combined multiplication circuit includes an input clamp apparatus, a combined multiplication apparatus, and an output clamp apparatus. The input clamp apparatus respectively clamps a plurality of input signals according to a plurality of adjustable predetermined values. These adjustable predetermined values are used for pre-clamping the input signal so as to avoid errors in the combined multiplication operation. The combined multiplication apparatus performs a combined multiplication operation to the clamping signals according to a combined multiplication parameter so as to output a plurality of results, wherein at least a plurality of multiplication parameters is used in the combined multiplication operation, and the combined multiplication parameter is obtained by multiplying these multiplication parameters. The output clamp apparatus respectively clamps foregoing results according to a plurality of predetermined thresholds so as to output the corrected input signals.

An embodiment of the image correcting method will be described herein in detail for explaining the combined multiplication method and circuit thereof provided the present invention. However, this embodiment is not intended for restricting the scope of the combined multiplication method and circuit thereof in the present invention. The method and circuit provided by the present invention can be applied to any case wherein multipliers are combined to reduce hardware cost so that correct output can be obtained besides reducing the hardware cost.

Figure 7:
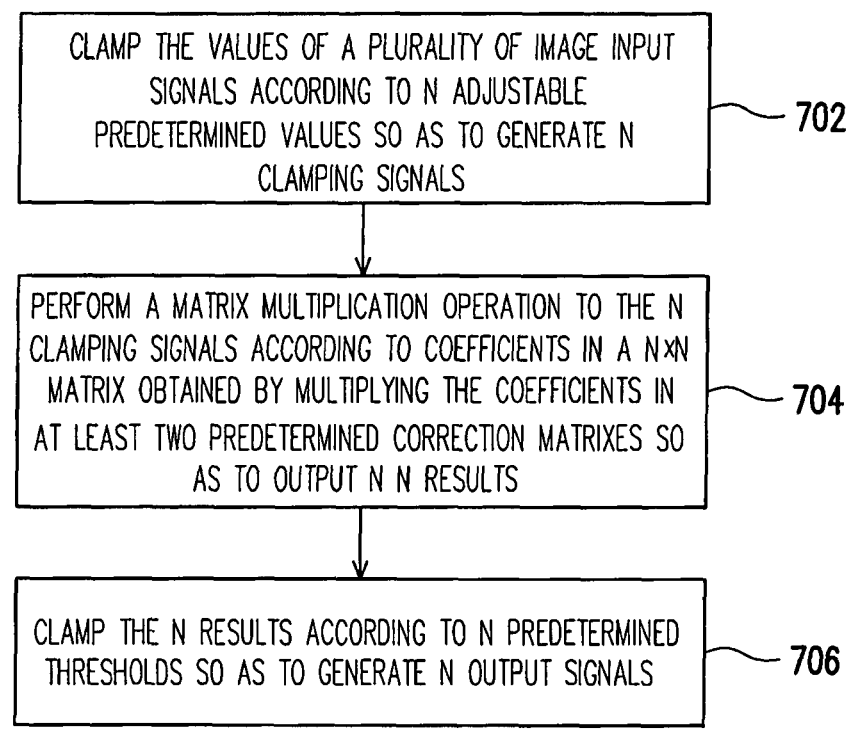
FIG. 7 is a flowchart of an image correcting method according to an embodiment of the present invention.

FIG. 7 is a flowchart of an image correcting method according to an embodiment of the present invention. First, the values of a plurality of image input signals are clamped according to N adjustable predetermined values, so as to generate N clamping signals, wherein N is a positive integer (step 702). Next, a matrix multiplication operation is performed to the N clamping signals according to the coefficients in an N×N matrix obtained by multiplying the predetermined coefficients in at least two correcting matrixes, so as to output N results (step 704). After that, the N results are clamped according to N predetermined thresholds, so as to generate N output signals (step 706).

To describe the present invention more clearly and compare the present invention with the conventional technique, in following description, the image input signals are assumed to be the signals of primary colors (namely, N=3), which are respectively a R signal, a G signal, and a B signal, the output signals are assumed to have 8 bits, and a white balance gain correcting process and a color correcting process are assumed to be executed to the image input signals. With foregoing assumptions, an image correcting circuit corresponding to the method illustrated in FIG. 7 is provided, as shown in FIG. 8.

Figure 8:
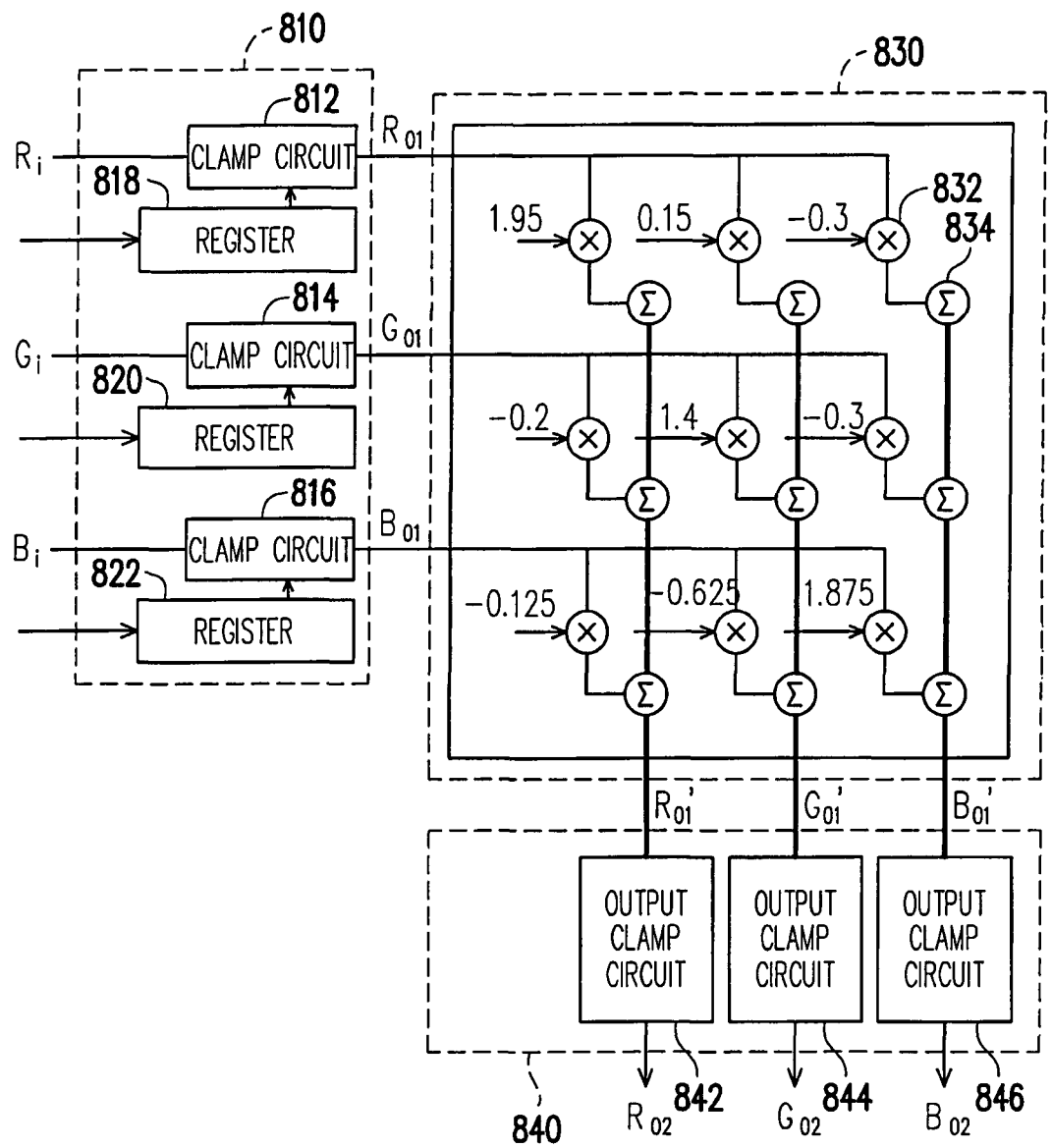
FIG. 8 is a circuit diagram of an image correcting circuit according to an embodiment of the present invention.

FIG. 8 is a circuit diagram of an image correcting circuit according to an embodiment of the present invention. Referring to FIG. 8, the image correcting circuit includes an input clamp apparatus 810, a combined multiplication apparatus 830, and an output clamp apparatus 840. The input clamp apparatus 810 receives the R signal, G signal, and B signal respectively denoted as Ri, Gi, and Bi. The input clamp apparatus 810 correspondingly clamps the values of the three image input signals according to three adjustable predetermined values and outputs three clamping signals $R_{o1}$, $G_{o1}$, and $B_{o1}$. The combined multiplication apparatus 830 performs a matrix multiplication operation to the three clamping signals according to the coefficients in a 3×3 matrix obtained by multiplying the coefficients in a color correcting matrix and the coefficients in a white balance gain matrix and outputs three results $R_{o1}'$, $G_{o1}'$, and $B_{o1}'$. The output clamp apparatus 840 clamps the values of foregoing three results according to three predetermined thresholds and outputs three output signals $R_{o2}$, $G_{o2}$, and $B_{o2}$.

The input clamp apparatus 810 includes clamp circuits 812, 814, 816 and registers 818, 820, 822. The clamp circuits 812, 814, and 816 respectively receive the signals Ri, Gi, and Bi, and respectively clamp the values of the received image input signals according to three adjustable predetermined values, so as to output the clamping signals $R_{o1}$, $G_{o1}$, and $B_{o1}$ respectively. The registers 818, 820, and 822 respectively register the adjustable predetermined values required by the clamp circuits 812, 814, and 816. The combined multiplication apparatus 830 includes a plurality of multipliers and adders arranged in arrays. For the convenience of description, only a multiplier 832 and an adder 834 will be described herein. The output clamp apparatus 840 includes three output clamp circuits 842, 844, and 846 corresponding to the three output values of the combined multiplication apparatus 830.

The present invention provides a combined multiplication circuit as shown in FIG. 8. The circuit includes an input clamp apparatus 810, a combined multiplication apparatus 830, and an output clamp apparatus 840. The components and numbers thereof in the circuit are not limited thereto but can be adjusted according to the image input signals to be processed.

Assuming the R signal gain coefficient $R_{gain}$, the G signal gain coefficient $G_{gain}$, and the B signal gain coefficient $B_{gain}$ in the white balance gain correcting matrix are respectively 1.5, 1, and 1.25, then the three adjustable predetermined values are obtained by respectively dividing the maximum values corresponding to the bit number (8 bits) of the output signals by the R signal gain coefficient, the G signal gain coefficient, and the B signal gain coefficient, namely, the three adjustable predetermined values are respectively 255/1.5=170, 255/1=255, and 255/1.25=204. The adjustable predetermined values 170, 255, and 204 are respectively registered in the registers 818, 820, and 822 to be respectively provided to the clamp circuits 812, 814, and 816.

The R signal gain coefficient $R_{gain}$, the G signal gain coefficient $G_{gain}$, and the B signal gain coefficient $B_{gain}$ may vary along with different image capturing mode of the digital camera. For example, in a night mode, the R signal gain coefficient $R_{gain}$, the G signal gain coefficient $G_{gain}$, and the B signal gain coefficient $B_{gain}$ may be respectively 1.5, 1, and 1.25, while in a close capturing mode, the R signal gain coefficient $R_{gain}$, the G signal gain coefficient $G_{gain}$, and the B signal gain coefficient $B_{gain}$ may be another three different values. Thus, the values registered in the registers 818, 820, and 822 may vary with different image capturing mode of the digital camera.

When $(R_i, G_i, B_i)=(230, 240, 190)$, the clamping signals $(R_{o1}, G_{o1}, B_{o1})$ are respectively clamped by the clamp circuits 812, 814, and 816 to obtain (170, 240, 190). Next, with following color correcting coefficients:

$$\begin{bmatrix} rr & rg & rb \\ gr & gg & gb \\ br & bg & bb \end{bmatrix} = \begin{bmatrix} 1.3 & -0.2 & -0.1 \\ 0.1 & 1.4 & -0.5 \\ -0.2 & -0.3 & 1.5 \end{bmatrix} \quad (6)$$

The combined matrix of the white balance gain correcting matrix and the color correcting matrix is expressed as:

$$\begin{bmatrix} rr & rg & rb \\ gr & gg & gb \\ br & bg & bb \end{bmatrix} \times \begin{bmatrix} R_{gain} & 0 & 0 \\ 0 & G_{gain} & 0 \\ 0 & 0 & B_{gain} \end{bmatrix} = \begin{bmatrix} 1.95 & -0.2 & -0.125 \\ 0.15 & 1.4 & -0.625 \\ -0.3 & -0.3 & 1.875 \end{bmatrix} \quad (7)$$

After that, the combined multiplication apparatus 830 performs a matrix multiplication operation to the clamping signals (170, 240, 190) according to the combined matrix obtained from foregoing equation (7) so as to obtain the results $R_{o1'}$, $G_{o1'}$, and $B_{o1'}$, wherein the operation is expressed as following:

$$\begin{bmatrix} R \\ G \\ B \end{bmatrix}_{o1'} = \begin{bmatrix} 1.95 & -0.2 & -0.125 \\ 0.15 & 1.4 & -0.625 \\ -0.3 & -0.3 & 1.875 \end{bmatrix} \times \begin{bmatrix} 170 \\ 240 \\ 190 \end{bmatrix} \quad (8)$$

And the results obtained are: $(R_{o1'}, G_{o1'}, B_{o1'})=(259.75, 242.75, 254.25)$. Finally, the three output clamp circuits 842, 844, and 846 in the output clamp apparatus 840 respectively clamps foregoing results $R_{o1}'$, $G_{o1}'$, and $B_{o1}'$ according to the predetermined thresholds, so as to obtain the output signals $(R_{o2}, G_{o2}, B_{o2})$. The predetermined thresholds are the maximum values (i.e. 255) corresponding to the output signals $R_{o2}$, $G_{o2}$, and $B_{o2}$, thus, the correct values $(R_{o2}, G_{o2}, B_{o2})=(255, 242.75, 254.25)$ are obtained.

If the image input signals $(R_i, G_i, B_i)$ are signals having the highest luminance, namely, $(R_i, G_i, B_i)=(255, 255, 255)$, then after the clamp circuits 812, 814, and 816 respectively clamp the image input signals $(R_i, G_i, B_i)$, the clamping signals $(R_{o1}, G_{o1}, B_{o1})$ obtained are (170, 255, 204). After that, the combined multiplication apparatus 830 performs a matrix multiplication operation to the clamping signals (170, 255, 204) according to the combined matrix obtained through foregoing expression (7) to obtain the results $(R_{o1}', G_{o1}', B_{o1}')=(255, 255, 255)$. Finally, the output clamp apparatus 840 clamps foregoing results $(R_{o1}', G_{o1}', B_{o1}')$ to obtain the output signals $(R_{o2}, G_{o2}, B_{o2})=(255, 255, 255)$, which are the correct values. Thus, according to the embodiment illustrated in FIG. 7 and FIG. 8, the circuit and method in the present invention can output correct values and accordingly prevent reduction in image quality.

As described above, the predetermined coefficients in the correcting matrix used by the combined multiplication apparatus 830 may include coefficients in the color correcting matrix and coefficients in the color space transform matrix, and the coefficients in the combined matrix are obtained by multiplying the coefficients in the color space transform matrix and the coefficients in the color correcting matrix. Similarly, the predetermined coefficients in the correcting matrix used by the combined multiplication apparatus 830 may also include coefficients in the white balance gain matrix, coefficients in the color correcting matrix, and coefficients in the color space transform matrix, and the coefficients in the combined matrix are obtained by sequentially multiplying the coefficients in the color space transform matrix and the coefficients in the color correcting matrix and the white balance gain matrix. However, it should be noted that if the predetermined coefficients in the correcting matrix used by combined multiplication apparatus 830 are changed, the adjustable predetermined values used by the input clamp apparatus 810 should be changed correspondingly.

The embodiment illustrated in FIG. 7 and FIG. 8 is only used for describing the present invention but not for restricting it. Since the image input signals may also be other signals other than primary color signals, according to the embodiment illustrated in FIG. 7 and FIG. 8, the number of the image input signals may be set to N, and the image correcting circuit may be corrected accordingly as shown in FIG. 9.

Figure 9:
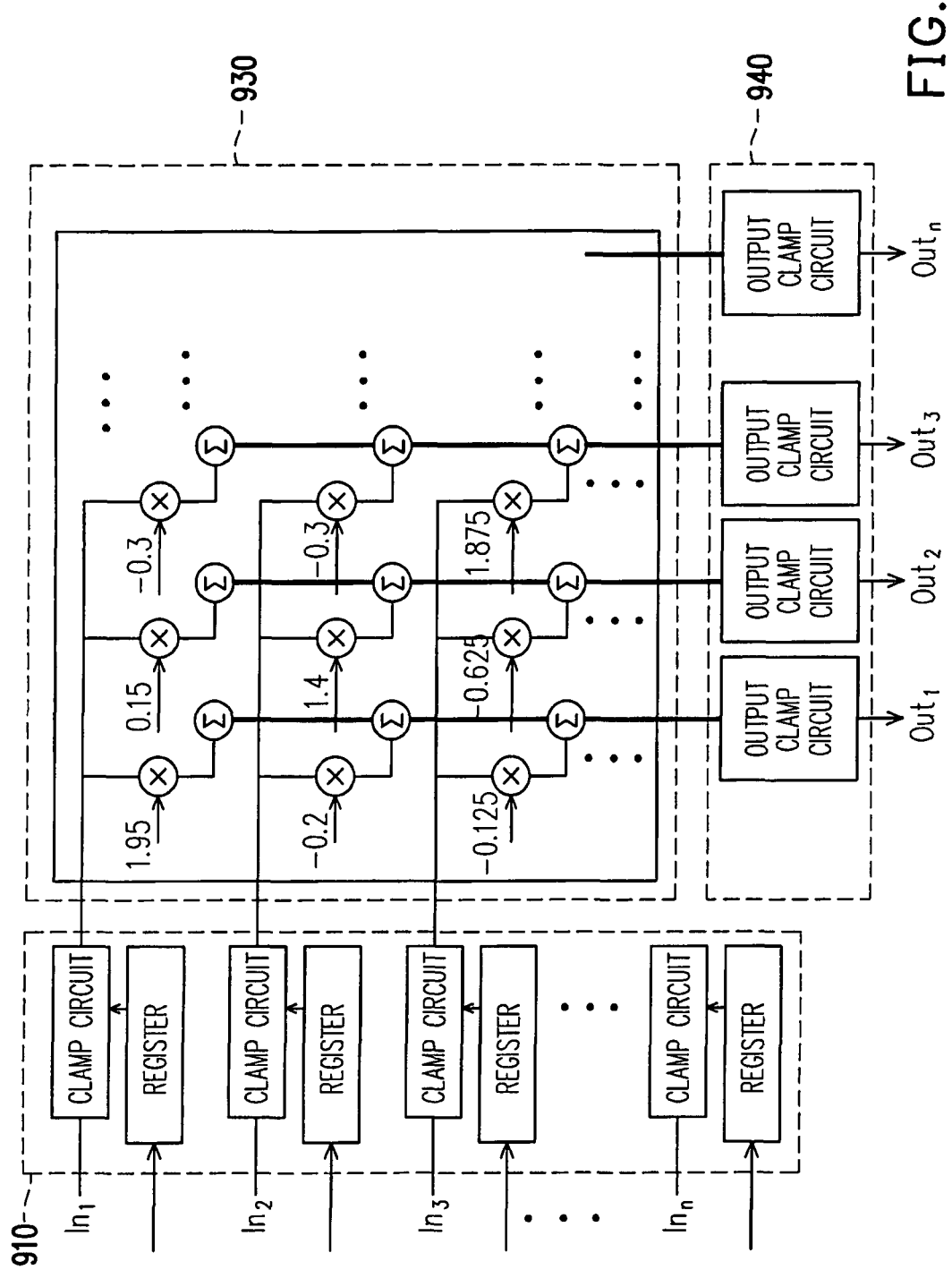
FIG. 9 is a circuit diagram of an image correcting circuit according to an embodiment of the present invention.

FIG. 9 is a circuit diagram of an image correcting circuit according to an embodiment of the present invention. In FIG. 9, $I_{n1} \sim I_{nm}$ represent image input signals, and $O_{ut1} \sim O_{utn}$ represent output signals. Referring to FIG. 9, the image correcting circuit includes an input clamp apparatus 910 corresponding to the image input signals, a combined multiplication apparatus 930, and an output clamp apparatus 940. The input clamp apparatus 910 receives the image input signals $I_{n1} \sim I_{nm}$ and has n sets of clamp circuits and registers. The combined multiplication apparatus 930 is a combined multiplication unit having a n×n matrix of coefficients, and the combined multiplication apparatus 930 performs a matrix multiplication operation to foregoing n clamping signals according to the predetermined coefficients in a matrix, for example, the coefficients in a n×n matrix obtained by multiplying the coefficients in the color correcting matrix and the coefficients in the white balance gain matrix, and outputs n calculation results. The output clamp apparatus 940 has n output clamp circuits for respectively clamping foregoing n calculation results according to n predetermined thresholds and outputting n output signals.

It should be mentioned that even though a possible pattern of the image correcting circuit has been described in foregoing embodiment, it should be understood by those skilled in the art that the design of the input clamp apparatus therein varies along different manufacturer. Thus, the application of the present invention is not limited to the possible pattern described above. In other words, it is within the scope of the present invention as long as an input clamp apparatus is used for clamping the values of N image input signals according to N adjustable predetermined values so as to prevent incorrect values to be input to a combined multiplication apparatus.

According to the present invention, the values of N image input signals have been clamped correspondingly according to N adjustable predetermined values by an input clamp apparatus before a combined multiplication apparatus receives the N image input signals, thus, incorrect values are prevented from being input to a combined multiplication apparatus. Accordingly, the circuit and method in the present invention can output correct values and accordingly prevent abnormal colors in the high luminance regions of an image.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A signal correcting method, adapted to a signal correcting circuit and suitable for executing a combined multiplication operation, wherein the combined multiplication operation comprises at least a plurality of multiplication parameters, and a combined multiplication parameter is obtained by multiplying the multiplication parameters, the signal correcting method comprising:
   performing a pre-clamping step by an input clamp apparatus of the signal correcting circuit, for clamping the values of a plurality of input signals according to a plurality of adjustable predetermined values, so as to generate a plurality of corresponding clamping signals, wherein the adjustable predetermined values are obtained by dividing maximum values corresponding to a bit number of output signals by gain coefficients;
   performing a combined multiplication operation to each of the clamping signals according to the combined multiplication parameter by a combined multiplication apparatus of the signal correcting circuit, so as to output a plurality of results; and
   respectively clamping the results according to a plurality of corresponding predetermined thresholds by an output clamp apparatus of the signal correcting circuit so as to output the corrected input signals.

2. The signal correcting method according to claim 1, wherein the predetermined thresholds are the maximum values corresponding to the input signals.

3. An image correcting method, adapted to a signal correcting circuit and suitable for executing a combined multiplication operation, wherein the combined multiplication operation comprises at least a plurality of multiplication parameters, and a combined multiplication parameter is obtained by multiplying the multiplication parameters, the image correcting method comprising:
   performing a pre-clamping step by an input clamp apparatus of the signal correcting circuit, for clamping the values of a plurality of image input signals according to a plurality of adjustable predetermined values so as to generate a plurality of corresponding clamping signals, wherein the adjustable predetermined values are obtained by dividing maximum values corresponding to a bit number of the image output signals by gain coefficients;
   performing a combined multiplication operation to each of the clamping signals according to the combined multiplication parameter by a combined multiplication apparatus of the signal correcting circuit, so as to output a plurality of results; and
   respectively clamping the results according to a plurality of corresponding predetermined thresholds by an output clamp apparatus of the signal correcting circuit so as to output the corrected image input signals.

4. The image correcting method according to claim 3, wherein the image input signals comprise signals of primary colors R, G, and B.

5. The image correcting method according to claim 4, wherein the multiplication parameters are a matrix of coefficients and comprise coefficients in a color correcting matrix and coefficients in a white balance gain matrix, wherein the combined multiplication parameter is obtained by multiplying the coefficients in the color correcting matrix and the coefficients in the white balance gain matrix.

6. The image correcting method according to claim 5, wherein the white balance gain matrix comprises an R signal gain coefficient, a G signal gain coefficient, and a B signal gain coefficient.

7. The image correcting method according to claim 6, wherein the adjustable predetermined values comprise three adjustable predetermined values obtained by dividing the maximum values corresponding to the bit number of the image output signals respectively by the R signal gain coefficient, the G signal gain coefficient, and the B signal gain coefficient.

8. The image correcting method according to claim 4, wherein the multiplication parameters are a matrix of coefficients and comprise coefficients in a color correcting matrix and coefficients in a color space transform matrix, wherein the multiplication parameters are obtained by multiplying the coefficients in the color space transform matrix and the coefficients in the color correcting matrix.

9. The image correcting method according to claim 4, wherein the multiplication parameters are a matrix of coefficients and comprise coefficients in a white balance gain matrix, coefficients in a color correcting matrix, and coefficients in a color space transform matrix, wherein the multiplication parameters are obtained by sequentially multiplying the coefficients in the color space transform matrix and the coefficients in the color correcting matrix and the white balance gain matrix.

10. The image correcting method according to claim 3, wherein the predetermined thresholds are the maximum values corresponding to the image input signals.

11. A signal correcting circuit, comprising:
    an input clamp apparatus, for receiving a plurality of input signals and respectively clamping the values of the input signals according to a plurality of corresponding adjustable predetermined values so as to output a plurality of clamping signals, wherein the adjustable predetermined values are obtained by dividing maximum values corresponding to a bit number of output signals by gain coefficients;
    a combined multiplication apparatus, performing a combined multiplication operation to the clamping signals according to a combined multiplication parameter so as to output a plurality of results, wherein at least a plurality of multiplication parameters is used in the combined multiplication operation, and the combined multiplication parameter is obtained by multiplying the multiplication parameters; and
    an output clamp apparatus, respectively clamping the results according to a plurality of predetermined thresholds so as to output the corrected input signals.

12. The signal correcting circuit according to claim 11, wherein the predetermined thresholds are the maximum values corresponding to the input signals.

13. An image correcting circuit, comprising:
    an input clamp apparatus, for receiving a plurality of image input signals and respectively clamping the values of the image input signals according to a plurality of corresponding adjustable predetermined values so as to output a plurality of clamping signals, wherein the adjustable predetermined values are obtained by dividing maximum values corresponding to a bit number of the image output signals by gain coefficients;

a combined multiplication apparatus, performing a combined multiplication operation to the clamping signals according to a combined multiplication parameter so as to output a plurality of results, wherein at least a plurality of multiplication parameters is used in the combined multiplication operation, and the combined multiplication parameter is obtained by multiplying the multiplication parameters; and an output clamp apparatus, respectively clamping the results according to a plurality of predetermined thresholds so as to output the corrected image input signals.

14. The image correcting circuit according to claim 13, wherein the multiplication parameters are a matrix of coefficients and comprise coefficients in a color correcting matrix and coefficients in a white balance gain matrix, wherein the combined multiplication parameter is obtained by multiplying the coefficients in the color correcting matrix and the coefficients in the white balance gain matrix.

15. The image correcting circuit according to claim 14, wherein the age input signals comprise signals of primary colors R, G, and B, and the white balance gain matrix comprises an R signal gain coefficient, a G signal gain coefficient, and a B signal gain coefficient.

16. The image correcting circuit according to claim 15, wherein the adjustable predetermined values comprise three adjustable predetermined values obtained by dividing the maximum values corresponding to the bit number of the image output signals respectively by the R signal gain coefficient, the G signal gain coefficient, and the B signal gain coefficient.

17. The image correcting circuit according to claim 13, wherein the multiplication parameters are a matrix of coefficients and comprise coefficients in a color correcting matrix and coefficients in a color space transform matrix, wherein the multiplication parameters are obtained by multiplying the coefficients in the color space transform matrix and the coefficients in the color correcting matrix.

18. The image correcting circuit according to claim 13, wherein the multiplication parameters are a matrix of coefficients and comprise coefficients in a white balance gain matrix, coefficients in a color correcting matrix, and coefficients in a color space transform matrix, wherein the multiplication parameters are obtained by sequentially multiplying the coefficients in the color space transform matrix and the coefficients in the color correcting matrix and the white balance gain matrix.

19. The image correcting circuit according to claim 13, wherein the predetermined thresholds are the maximum values corresponding to the image input signals.

* * * * *